United States Patent [19]
Kayler

[11] 3,910,540
[45] Oct. 7, 1975

[54] MAGNETIC BASE ASSEMBLY FOR EMERGENCY LIGHT UNIT AND THE LIKE AND METHOD OF MAKING SAME

[76] Inventor: Robert D. Kayler, 3533 Valleywood Drive, Kettering, Ohio 45429

[22] Filed: Jan. 10, 1974

[21] Appl. No.: 432,200

[52] U.S. Cl. .......................... 248/206 A; 240/52.15
[51] Int. Cl.² ............................................. B60Q 1/56
[58] Field of Search ....... 248/206 A; 240/52.15, 57, 240/7.1 E, 7.35

[56] References Cited
UNITED STATES PATENTS

| | | | |
|---|---|---|---|
| 2,875,324 | 2/1959 | Camp et al. | 248/206 A |
| 3,365,684 | 1/1968 | Stemke et al. | 248/206 A |
| 3,383,148 | 5/1968 | Dicken | 211/41 X |
| 3,439,159 | 4/1969 | McRoskey et al. | 240/52.15 X |
| 3,518,884 | 7/1970 | Wood | 248/206 A X |
| 3,637,181 | 1/1972 | Janssen | 248/205 A |
| 3,800,449 | 4/1974 | Minatodani | 248/205 A |

Primary Examiner—J. Franklin Foss
Attorney, Agent, or Firm—Jacox & Meckstroth

[57] ABSTRACT

An emergency rotating light unit is temporarily attached to the body of a motor vehicle by a magnetic base assembly including an annular metal base plate having a depending circumferentially extending skirt portion. A plurality of flat block-like permanent magnets are cemented to the base plate in spoke-like radial positions, and each magnet is magnetized across its thickness after it is attached to the base plate. The base plate and the permanent magnets are heated and placed within a fluidized bed of thermoplastic powder to form a thin continuous layer or coating over the plate and magnets. A set of holes are formed in the base plate for attaching the base assembly to the light unit, and the center hole within the base plate provides for receiving a power supply cord extending from the light unit.

7 Claims, 3 Drawing Figures

MAGNETIC BASE ASSEMBLY FOR EMERGENCY LIGHT UNIT AND THE LIKE AND METHOD OF MAKING SAME

BACKGROUND OF THE INVENTION

Various forms of magnetic bases have been used for attaching devices or accessories to the sheet metal body of an automobile or other motor vehicle to eliminate the need for forming one or more holes in the vehicle body for receiving threaded fasteners such as screws or bolts. In any such magnetic support base, it is highly desirable to provide for substantial magnetic attraction between the support base and the sheet metal body so that the article does not shift or slide on the body when the vehicle is being operated, especially at high speed. For example, it is usually mandatory that an emergency vehicle be provided with a rotating red light when the vehicle is being driven during an emergency situation, and the rotating light be displayed on the rooftop of the moving vehicle. Frequently it is desirable to mount the rotating light on top of the vehicle only temporarily when the vehicle is being operated during an emergency situation, and under normal operation of the vehicle, the light unit is stored inside the vehicle to prevent possible theft and for law enforcement undercover work.

One form of magnetic base which has been used to attach temporarily a rotating light unit to the roof of an automobile, incorporates a flat generally U-shaped thin metal sheet which carries a set of permanent magnets. However, the flexibility of the plate and the detachment of the magnets, do not provide for a dependable attachment of the light unit to the rooftop of the motor vehicle, especially when the vehicle is being driven at a high speed and the light unit is subjected to substantial wind pressure. In addition, the magnets slide easily on the vehicle rooftop and have a tendency to scratch the paint on the rooftop.

SUMMARY OF THE INVENTION

The present invention is directed to an improved magnetic base assembly which is ideally suited for attaching a rotating emergency light unit to the rooftop of the motor vehicle, but which may also be used for attaching other accessories or articles such as radio antennas, speakers and funeral flags to the vehicle. The magnetic base assembly of the invention is especially compact in a vertical direction and provides for substantial magnetic attraction to the metal body of the motor vehicle so that the article is dependably attached to the vehicle. In addition, the magnetic base assembly of the invention provides substantial resistance to corrosion by a continuous coating of plastics material which also prevents scratching of the painted top surface of the vehicle body.

In accordance with the preferred embodiment of the invention, the magnetic base assembly of the invention consists of an annular rigid metal base plate having a flat annular support portion surrounded by a depending circumferentially extending skirt portion. A set of barium-iron oxide ceramic magnets are attached to the underneath surface of the base plate by a heat activated epoxy cement, and the block shaped magnets are arranged in radial spoke-like relation. The magnetic blocks are magnetized across their thickness after the blocks are cemented to the base plate, and the assembly of the base plate and permanent magnets are coated with a thermoplastics material by heating the assembly and then immersing the assembly into a fluidized powdered bed of the thermoplastics material.

Other features and advantages of the invention will be apparent from the following description, the accompanying drawing and the appended claims.

DESCRIPTION OF THE PREFERRED EMBODIMENT

Figure 1:
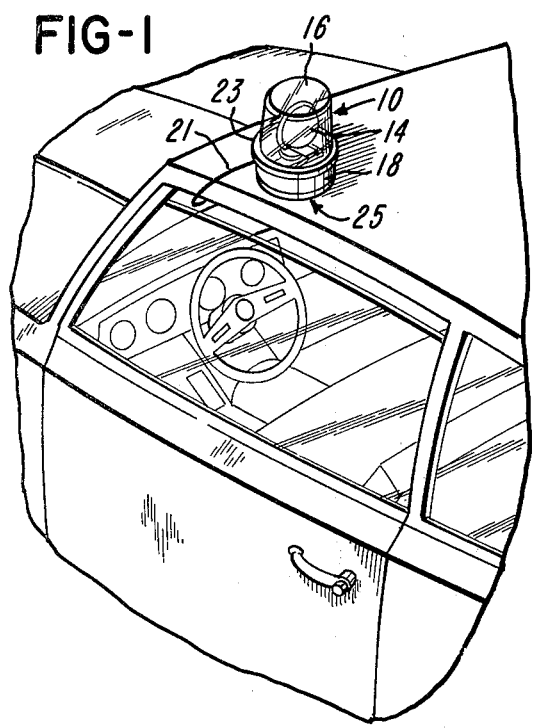
FIG. 1 is a fragmentary perspective view of an automobile and illustrating the attachment of an emergency rotating light unit to the rooftop of the vehicle body by a magnetic base assembly constructed in accordance with the invention.

As illustrated in FIG. 1, an emergency rotating light unit 10 is mounted on the rooftop of an automobile body by a magnetic base assembly which is constructed in accordance with the present invention. The emergency light unit 10 includes a sealed beam lamp 14 which is supported for 360° rotation within a dome 16 molded of a transparent plastic material having a red tint. The lamp 14 is rotated by a gear reducing unit driven by an electric motor (not shown) enclosed within a metal cup-shaped lower case portion 18 of the light unit 10. Electrical power is supplied to the motor through a flexible power cord 21 which extends to a plug (not shown) suitable for inserting into a cigarette lighter socket on the dashboard of the vehicle. Preferably, the lower metal case portion 18 of the light unit 10 is chrome plated and is attached to the dome 16 by a releasable band clamp 23.

In accordance with the present invention and as mentioned above, a compact high strength magnetic base assembly 25 releasably secures the light unit 10 to the metal rooftop of the automobile. The magnetic base assembly 25 includes circular or annular base plate 26 which is preferably formed of cold-rolled steel and includes a flat circular support portion 28 which continues to form a peripherally or circumferentially extending depending cylindrical skirt portion 29.

A circular hole 32 is formed within the center of the flat support portion 28 and is of sufficient size to receive the plug on the end of the power cord 21 so that the magnetic base assembly 25 may be conveniently attached to the light unit 10 after the power cord 21 and cigarette lighter plug are connected to the light unit. A set of three uniformly spaced holes 34 are also formed within the flat support portion 28 of the base plate 26. The holes 34 are adapted to receive threaded fasteners or screws 36 (FIG. 2) which extend through the bottom wall of the case 18 of the light unit 10 and receive corresponding lock washers 37 and nuts 38 so that the base plate 26 is rigidly attached or secured to the light unit 10.

A plurality of permanent magnets 45 are arranged on the lower surface of the support portion 28 of the base plate 26 in uniformly spaced spoke-like radial positions, and each magnet 45 is formed of a ceramic barium-iron oxide material and is magnetized across its thickness or between the parallel flat side surfaces 46 of the magnet, as will be explained later.

Figure 4:
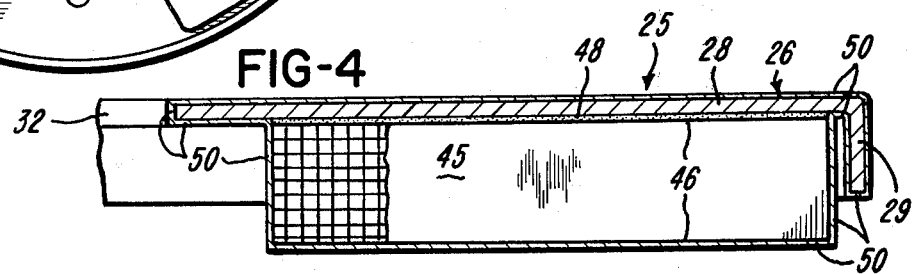
FIG. 4 is an enlarged fragmentary section taken generally on the line 4—4 of FIG. 3.

Each of the magnets 45 is rigidly secured to the underneath surface of the base plate 26 by a layer 48 of heat activated epoxy cement (FIG. 4), and the thickness of the magnets 45 is somewhat greater than the height of the skirt portion 29 of the base plate 26 so that the coplanar bottom surfaces 46 of the magnets 45 project below the lower edge surface of the skirt portion 29. As shown in FIG. 4, the entire assembly of the base plate 26 and the permanent magnets 45 are covered with a protective coating or layer 50 having a substantially uniform thickness and formed of a moisture resistant plastics material. Preferably, the coating 50 is formed of a polyvinyl chloride commonly referred to as a plastisol.

The magnetic base assembly 25 is constructed by taking a flat circular sheet of cold rolled steel and either drawing or spinning the sheet to form the depending skirt portion 29. The sheet is then punched to form the holes 32 and 34 and is cleaned with a suitable cleaning solution or solvent. A coating 48 of the heat activated epoxy cement is applied to one side surface 46 of each of the blocks forming the magnets 45 and before the magnets are magnetized. The blocks are then placed in a fixture plate (not shown) to orientate or locate the blocks forming the magnets 45 in their radial positions, and the base plate 26 is pressed into engagement with the epoxy coated surfaces of the blocks. The base plate 26 and blocks forming the magnets 45 are then heated in an oven at a temperature of 500° F. for approximately ten minutes to cure the epoxy coating 48. After the base plate and blocks have cooled, a plastisol primer coating is applied to the entire exposed surfaces of the assembly of the base plate 26 and blocks forming the magnets 45 and then allowed to dry for 3 to 5 minutes.

The assembly of the base plate and magnet blocks is preheated in an oven at 575° F. for approximately 10 minutes and then dipped into a fluidized bed of polyvinyl chloride powder. After the assembly has remained in the powder for a few seconds, it is removed and quenched in water to form the durable plastics coating 50 over the entire base assembly 25. Each of the blocks forming the permanent magnets 45 is then magnetized across its thickness by placing each block within a strong magnetic field of either a permanent magnet or an electromagnet.

From the drawing and the above description, it is apparent that a magnetic base assembly 25 constructed in accordance with the present invention provides desirable features and advantages. For example, the assembly of the base plate 26 and the permanent magnets 45 has substantial rigidity as a result of the skirt portion 29 so that the assembly does not flex. In addition, by magnetizing the magnets 45 through the plate 26 after the magnets are attached to the plate, a high strength magnetic attraction is provided within a compact vertical space. As a result, when the magnetic base assembly 25 is used for temporarily attaching the emergency light unit 10 to the rooftop of a motor vehicle, the vehicle may be operated at a high speed without the light unit tipping or sliding on the rooftop due to wind pressure. Furthermore, the relatively hard durable coating 50 of plastisol over the entire exposed surface of the base assembly 25, prevents any corrosion of the base plate 26 or magnets 45 and, in addition, assures that the bottom surfaces of the magnets 45 will not scratch or mar the painted surface on the vehicle rooftop. The skirt portion 29 also provides for covering the magnets 45.

Figure 2:
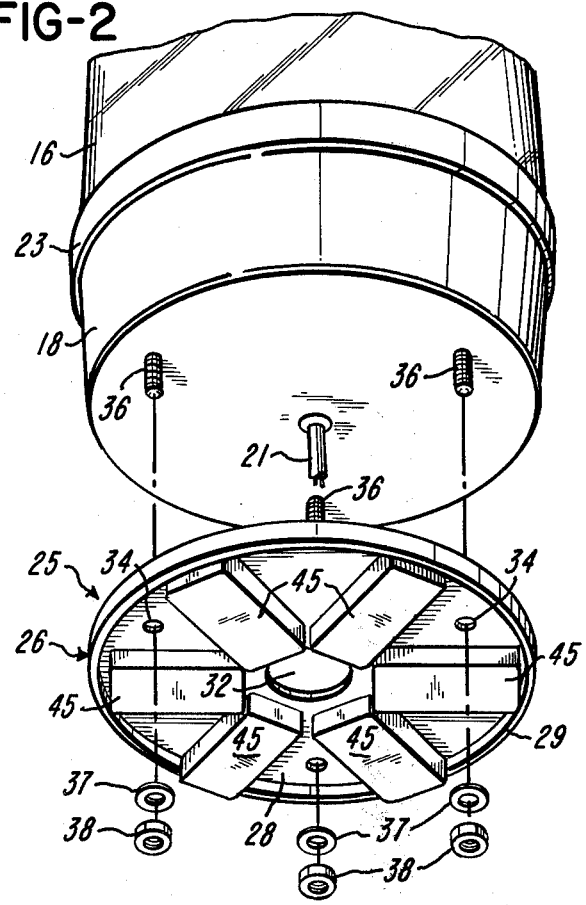
FIG. 2 is a perspective view of the underneath side of the magnetic base assembly shown in FIG. 1 and illustrating it in an exploded relation to the lower portion of the emergency light unit.
Figure 3:
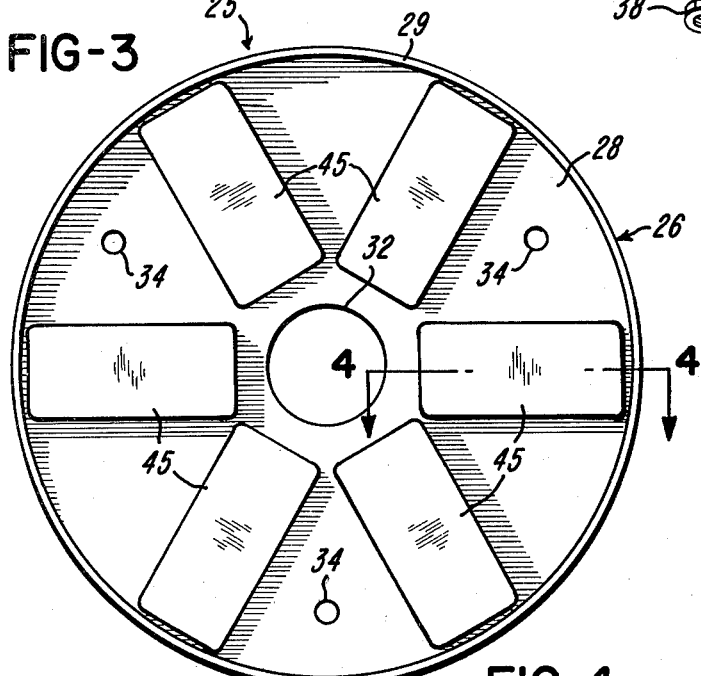
FIG. 3 is a bottom view of the magnetic base assembly shown in FIG. 2.

Furthermore, the orientation or arrangement of the permanent magnets 45 on the base plate 26, provides for a uniform distribution of the magnetic forces and assures that the light unit 10 will remain attached to the rooftop of the vehicle regardless of how the light unit 10 is orientated with respect to the front of the vehicle. While the magnetic base assembly is illustrated in FIGS. 1 and 2 for the purpose of temporarily securing the light unit 10 to the body of a motor vehicle, it is to be understood that the magnetic base assembly 25 may be used for attaching other accessories to the vehicle body, such as large radio antennas and funeral flags.

While method and form of magnetic base assembly herein described constitute a preferred embodiment of the invention, it is to be understood that the invention is not limited to the precise method and form of base assembly described, and that changes may be made therein without departing from the scope and spirit of the invention as defined in the appended claims.

The invention having thus been described, the following is claimed:

1. In an emergency light unit including a lamp supported within a light transmitting dome mounted on a generally pan-shaped housing having a substantially flat circular bottom wall surrounded by a band-like side wall, an improved compact magnetic base assembly for firmly attaching said light unit to the metal body of a motor vehicle, comprising a circular sheet metal base plate including a substantially flat upper wall portion positioned adjacent said bottom wall of said housing, a generally cylindrical skirt portion extending around said upper wall portion and projecting downwardly therefrom as an integral part of said base plate, said skirt portion having a diameter generally the same as the diameter of said bottom wall of said housing and forming generally a continuation of said side wall of said housing, means for securing said upper wall portion of said base plate to said bottom wall of said housing, a plurality of substantially flat permanent magnets each having parallel upper and lower surfaces with the flux path extending therebetween, means for securing said upper surfaces of said magnets to the bottom surface of said upper wall portion of said base plate, said magnets being disposed in an angularly spaced annular arrangement on said upper wall portion, said skirt portion has a height less than the thickness of said magnets between said upper and lower surfaces to permit said lower surfaces of said magnets to be magnetically attracted to the body of the vehicle, said skirt portion surrounds said annular arrangement of magnets and cooperates with said upper wall portion to form an enclosure for said magnets, and a coating of moisture resistant material covering said base plate and said magnets.

2. A light unit and magnetic base assembly as defined in claim 1 wherein said coating of moisture resistant material comprises a uniform layer of polyvinyl chloride.

3. A light unit and magnetic base assembly as defined in claim 1 wherein said means for securing said magnets to said base plate, comprise a heat activated epoxy cement.

4. A light unit and magnetic base assembly as defined in claim 1 wherein each of said magnets is generally rectangular in configuration, and said magnets are disposed in spoke-like positions on said upper wall portion of said base plate with the length of each magnet being generally radial.

5. A light unit and magnetic base assembly as defined in claim 1 wherein said upper wall portion of said base plate has a center opening, said magnets are elongated, and said magnets extend longitudinally between said center opening and said skirt portion.

6. A light unit and magnetic base assembly as defined in claim 1 wherein said means for securing said upper wall portion of said base plate to said light unit comprise a plurality of threaded fasteners projecting downwardly from the bottom wall of said light unit, and means defining a corresponding plurality of holes within said upper wall portion of said base plate between said magnets for receiving said fasteners.

7. In an emergency light unit including a lamp supported within a light transmitting dome mounted on a pan-shaped housing having a substantially flat circular bottom wall surrounded by a band-like side wall, an improved compact magnetic base assembly for firmly attaching said light unit to the metal body of a motor vehicle, comprising a circular sheet metal base plate including a substantially flat upper wall portion positioned adjacent said bottom wall of said housing, a generally cylindrical skirt portion extending around said upper wall portion and projecting downwardly therefrom as an integral part of said base plate, said skirt portion having a diameter generally the same as the diameter of said bottom wall of said housing and forming generally a continuation of said side wall of said housing, a plurality of threaded fasteners for securing said upper wall portion of said base plate to said bottom wall of said housing, a plurality of substantially flat and generally rectangular permanent magnets each having parallel upper and lower surfaces with the flux path extending therebetween, adhesive means for securing said upper surfaces of said magnets to the bottom surface of said upper wall portion of said base plate, said magnets being disposed in an angularly spaced annular arrangement on said upper wall portion, said skirt portion has a height less than the thickness of said magnets between said upper and lower surfaces to permit said lower surfaces of said magnets to be magnetically attracted to the body of the vehicle, said skirt portion surrounds said annular arrangement of magnets and cooperates with said upper wall portion to form an enclosure for said magnets, and a coating of moisture resistant material covering said base plate and said magnets.

* * * * *